Inventor
Charles Thomson
By Stevens, Davis, Miller & Mosher
Attorneys

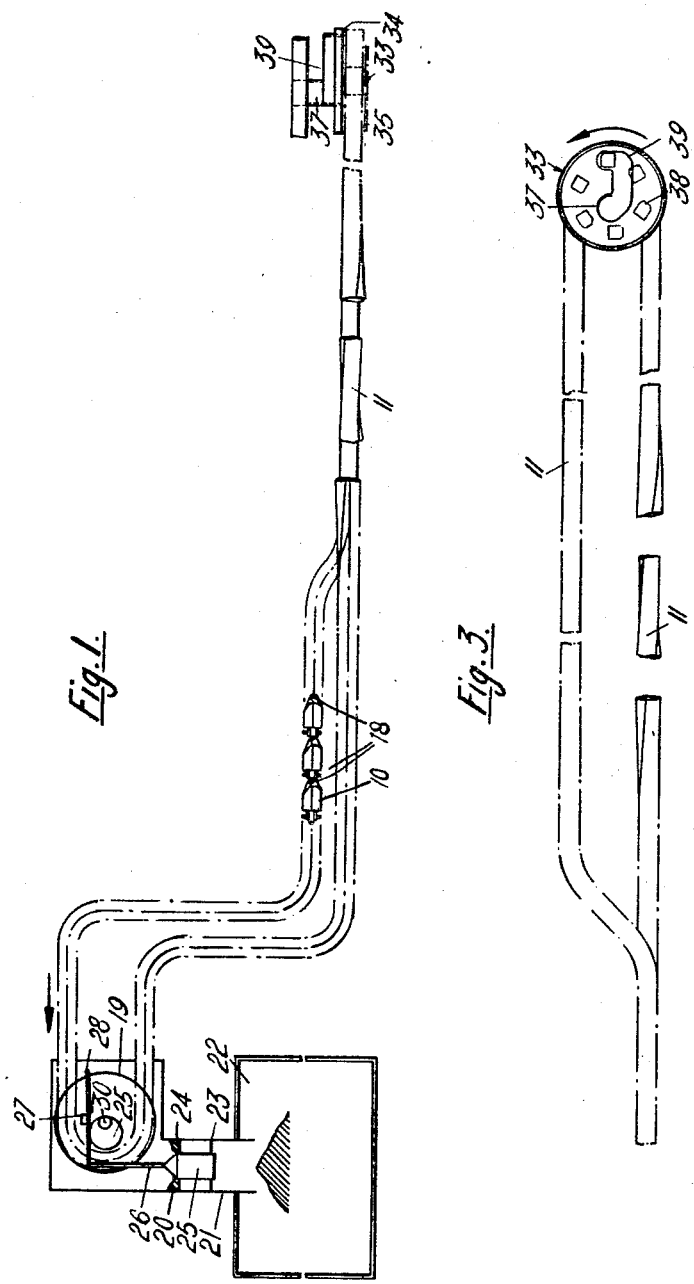

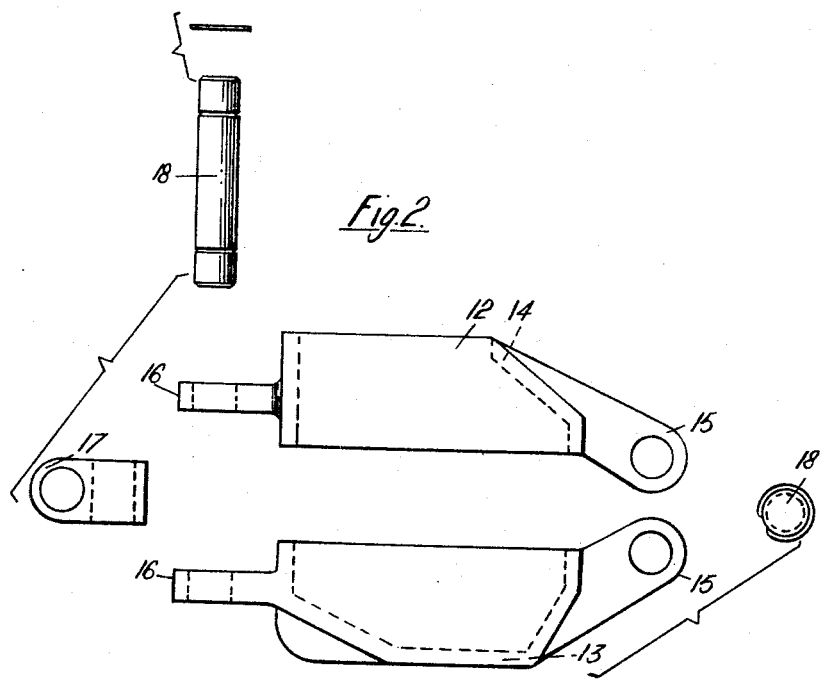
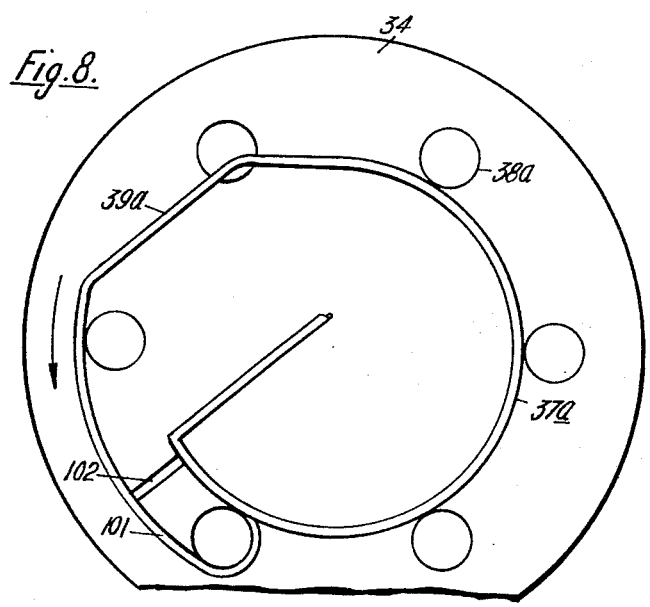

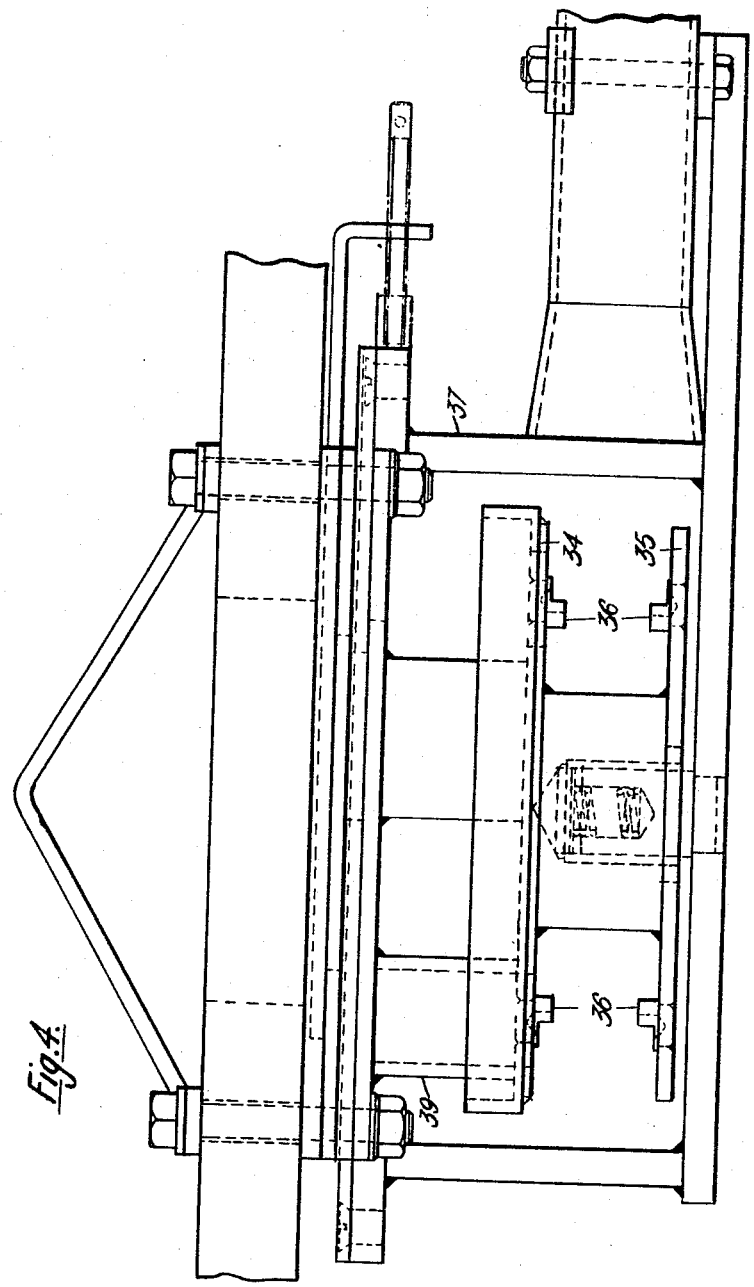

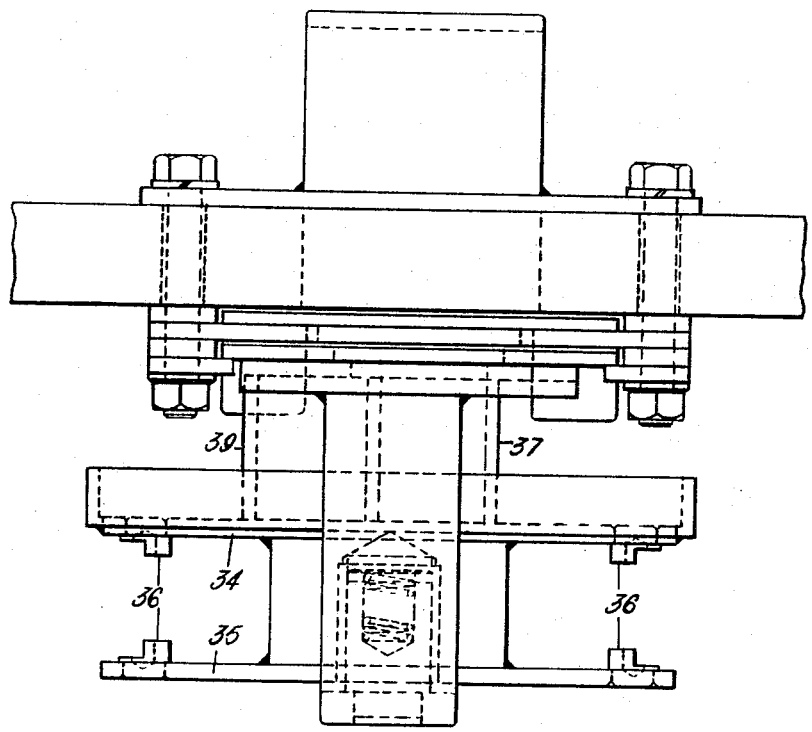

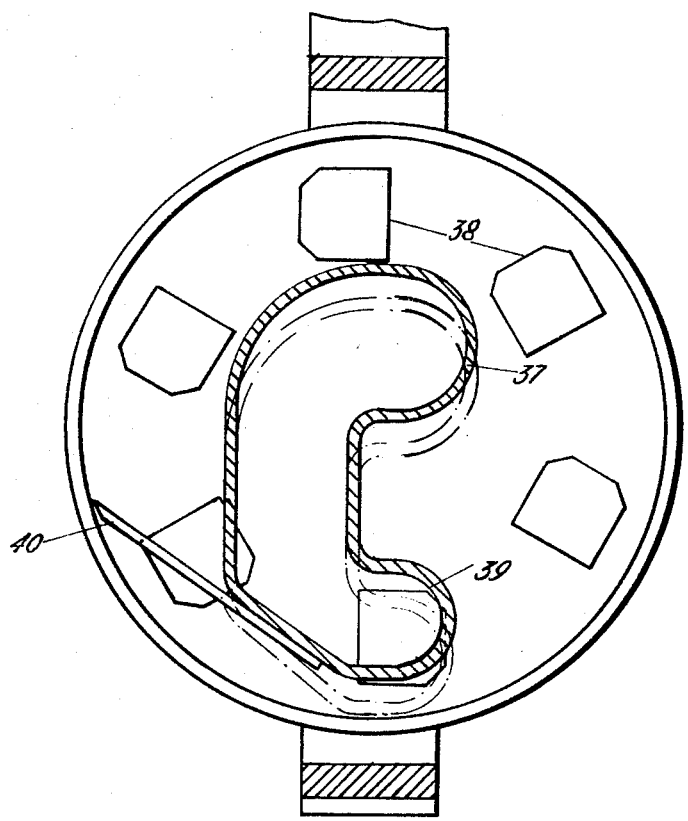

United States Patent Office 3,318,437
Patented May 9, 1967

3,318,437
SOLIDS HANDLING EQUIPMENT
Charles Thomson, Esher, England, assignor to Solar Thomson Engineering Company Limited, Cobham, England
Filed Aug. 12, 1965, Ser. No. 479,161
Claims priority, application Great Britain, Oct. 2, 1964, 40,265/64
4 Claims. (Cl. 198—62)

This invention is concerned with solids feeding means and particularly, but not exclusively, with means for feeding solids in granular or small lump form, e.g. coal into a bucket conveyor.

According to the invention, solids feeding means for supplying containers (e.g. the buckets of a bucket conveyor) with said solids comprises a horizontal feed plate rotatable about a vertical axis, said plate having a plurality of feed holes spaced around a common circle centered on said axis, locating means for maintaining the openings of said containers in register with said holes as the plate rotates, and a stationary enclosure closed at the bottom by said plate and adapted to receive solids to be fed to the containers, said enclosure including a part extending over an area traversed by a portion of said plate between the axis of rotation and said holes whereby solids are carried round therein by said plate and a part extending over an area traversed by said holes for receiving solids from the first-said part of the enclosure and allowing them to pass through the holes into the containers.

The second-said part of the enclosure may include a passageway closed at the end opposite to the end at which solids enter and, to avoid jamming of lumps of the solids between the edge of a feed hole and a wall of said enclosure, the passageway preferably extends in the direction of rotation for a distance substantially greater than the length of a feed hole.

The following is a description, by way of example, of embodiments of the present invention. Reference is made to the accompanying drawings, in which:

FIG. 1 is a side view of a conveyor system including feeding means according to the invention.

FIG. 2 is an exploded side view of a bucket as used in the system.

FIG. 3 is a plan view of part of the system.

FIG. 4 is a side view of a chain wheel and feed arrangement.

FIG. 5 is an end view of the arrangement of FIG. 4.

FIGS. 6 and 7 are plan views, partly in section, corresponding to FIGS. 4 and 5 respectively; and FIG. 8 is a plan view of a modification.

Figure 6:
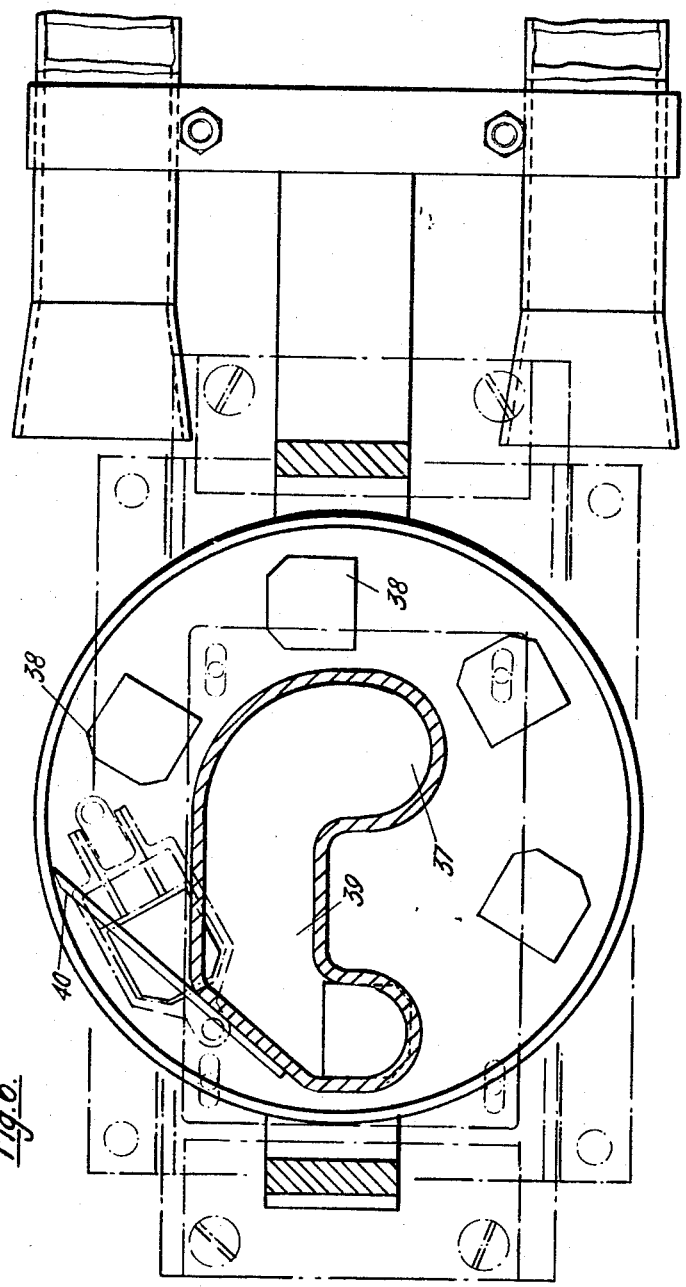

The conveyor system shown in the drawings comprises an endless bucket-conveyor 10 for transporting very small anthracite (under ⅜ inch) from a fuel storage bunker to a hopper feed boiler. The bucket-conveyor 10 runs through a smooth guide-tube 11 made of a plastics material, and this tube can be secured as required along walls or other supports. Each bucket of the conveyor 10 is moulded from plastics in two parts 12 and 13, the upper part 12 having an overhanging lip 14. The parts 12 and 13 have co-operating lugs 15 and co-operating lugs 16 (each part having two lugs 15 and one lug 16), at their trailing and leading ends respectively with holes which register with one another when the two parts are brought together to form the bucket. The axes of the holes in the lugs 15 extend at right angles relative to the holes in the lugs 16. Coupling pieces 17 fit between the co-operating lugs and have two holes registering with the holes in the lugs. Pivot pins 18 are passed through and retained by circlips in the registering holes in the lugs and coupling pieces and serve to hold the parts 12 and 13 together and to establish a pivotal connection between each bucket and the two adjacent coupling pieces. Thus, the chain can deflect sideways or upwards as necessary.

At the delivery end of the system, the conveyor passes round a discharge pulley 19, where the anthracite falls from the buckets into a well 20. A passage 21 leads from the well 20 into the top of the hopper 22 of the boiler. In this passage are disposed two vertically-spaced rubber seals 23 and 24 having control holes adapted to be closed by a vertically-reciprocable feed plunger 25. The spacing of the seals is less than the length of the plunger. The plunger is carried by a rod 26 pivoted at its top to a horizontally extending arm 27 which is in turn pivoted at 28 to a fixed support and which, under the weight of the plunger, bears down on a cam 29 keyed to the drive shaft 30 for the pulley 19. Thus, rotation of the pulley 19 is accompanied by vertical reciprocation of the plunger which allows anthracite to feed into the hopper. FIG. 1 shows the plunger in an intermediate position closing both seals.

Before the bucket-chain returns from the discharge wheel to the feeding mechanism 33 at the other end of the system, it is necessary to turn the buckets through 180° so that they are ready to receive more anthracite. If the chain is sufficiently flexible, this turning can be done simply by twisting the guide tube. If the chain is not sufficiently flexible for this to be done, it is necessary to provide additional guide wheels to effect turn-over.

At the feed mechanism 33, the buckets pass round a chain wheel rotatable on a vertical axis and having two side plates 34 and 35 each with inwardly-projecting half bushes 36 which engage with the ends of the pivot pins 18 of the buckets, which pins project beyond the lugs 15 and 16 but not beyond the boundaries of the chain (i.e. not beyond the bodies of the buckets). The upper side plate 34 has an upstanding peripheral wall and a number of feed holes or apertures 38 of the same shape and size as the top openings of the buckets and so arranged relative to the half bushes 36 as to register with those openings as the buckets pass round the chain wheel. Disposed above the feed plate 34 is a fixed open-bottomed anthracite supply duct 37 which is displaced from the axis of rotation of the chain wheel. The lower portion of the duct 37 has an open-bottomed lateral extension 39 of a generally arcuate shape in plan which progressively overlaps the path of movement of the apertures 38. The duct and its extension constitute an enclosure for the anthracite being fed. The rotary movement of the plate 34 thereby draws anthracite round from the duct 37 into the extension 39 so that it can pass through the apertures 38 into the buckets. The lower edges of the duct 37 and extension 39 are as close as practicable to the surface of the plate 34, but some leakage is liable to occur and consequently a rubber blade 40 is provided for deflecting such material into the apertures 38. The duct 37 and extension 39 can be moved bodily to vary the displacement of the duct 37 from the axis of rotation and thus control the rate of supply into the buckets. FIG. 7 shows the duct and extension in full lines in the maximum feed position and in chain lines in the minimum feed position.

While the arrangement shown in FIGURES 1 to 7 will operate without any difficulty if the anthracite is without oversize lumps, the presence of lumps is liable to result in jamming of lumps between the edges of the apertures 38 and the wall of the enclosure. To minimise this risk, the modification shown in FIGURE 8 may be employed. In this modification, the anthracite supply duct 37a has a lateral extension 39a terminating in an elongated passageway 101 of substantially greater length in the direction of rotation (shown by the arrow) than the feed holes or apertures 38a and this passageway is preceded by an area of said extension of substantially equal length also traversed by the apertures 38a. Thus, any lumps will fall through an aperture 38a before the latter reaches the end of the passageway since the lumps will reach the path of the apertures at a position well in advance of said end of the passageway. A rubber blade 102 may be provided across the passageway adjacent the entry end thereof to sweep the surface of the anthracite and push lumps into the apertures. In this modification, the apertures 38a are circular as shown in the drawings.

The construction of the conveyor 10 and the buckets and the arrangement at the discharge end of the conveyor 10 are the subject of our co-pending applications Nos. 474,286, filed July 23, 1965 and 479,162, filed Aug. 12, 1965 and, per se form no part of the present invention.

The conveyor may be driven by any suitable form of drive motor through a chain wheel of the conveyor.

I claim:

1. Solids feeding means for supplying containers with solids, said means comprising a horizontal feed plate rotatable about a vertical axis, said plate having a plurality of feed holes spaced around a common circle centered on said axis; locating means for maintaining the openings of said containers in register with said holes as the plate rotates; and a stationary enclosure closed at the bottom by said plate and adapted to receive solids to be fed to the containers, said enclosure including a first portion extending over an area traversed by a portion of said plate between the axis of rotation and said holes so that solids are carried within said first portion by said plate, and a second portion extending over an area traversed by said holes for receiving solids from said first portion of the enclosure and allowing them to pass through the holes into the containers, said second portion including a passageway closed at the end opposite to the end at which solids enter, and a section preceding said passageway, said passageway and said section both being substantially longer in the direction of rotation than a feed hole.

2. Solids feeding means according to claim 1 wherein a flexible wiper member extends across the passageway adjacent the inlet end thereof so as to restrain larger pieces of solid from entering the passageway.

3. Solids feeding means according to claim 1 wherein a stationary deflecting member is provided outside the enclosure and extends across the path of the holes in the plate so as to deflect into these holes any solids escaping between the enclosure and the plate.

4. Solids feeding means according to claim 1 wherein said locating means comprise projections engageable with portions of a container in which the containers are articulated for movement relative to one another in a horizontal plane, said projections providing a driving connection between the plate and the container.

References Cited by the Examiner

UNITED STATES PATENTS 658,657  9/1900  Le Grand _____ 198—63

FOREIGN PATENTS 256,800  8/1926  Great Britain.

EVON C. BLUNK, *Primary Examiner.*

R. J. HICKEY, *Assistant Examiner.*